United States Patent
Dreux

(10) Patent No.: US 9,251,379 B2
(45) Date of Patent: Feb. 2, 2016

(54) CLOCK SIGNAL SYNCHRONIZATION AND DISTURBANCE DETECTOR

(71) Applicant: STMicroelectronics (Rousset) SAS, Rousset (FR)

(72) Inventor: Philippe Dreux, Marseilles (FR)

(73) Assignee: STMicroelectronics Rousset SAS, Rousset (FR)

( * ) Notice: Subject to any disclaimer, the term of this patent is extended or adjusted under 35 U.S.C. 154(b) by 0 days.

(21) Appl. No.: 13/670,304

(22) Filed: Nov. 6, 2012

(65) Prior Publication Data

US 2013/0127549 A1 May 23, 2013

(30) Foreign Application Priority Data

Nov. 17, 2011 (FR) .................... 11 60479

(51) Int. Cl.
| | |
|---|---|
| *H03K 3/03* | (2006.01) |
| *G06F 21/75* | (2013.01) |
| *H03K 3/0231* | (2006.01) |
| *H03K 3/354* | (2006.01) |
| *H03L 7/099* | (2006.01) |

(52) U.S. Cl.
CPC .............. *G06F 21/75* (2013.01); *H03K 3/0315* (2013.01); *H03K 3/0231* (2013.01); *H03K 3/354* (2013.01); *H03L 7/0995* (2013.01)

(58) Field of Classification Search
CPC ... H03K 3/0315; H03K 3/0231; H03K 3/354; H03L 7/0995; G06F 21/75

USPC ...................... 331/37, 38, 50, 55, 56, 57, 135
See application file for complete search history.

(56) References Cited

U.S. PATENT DOCUMENTS

| | | | | |
|---|---|---|---|---|
| 5,689,213 | A | * | 11/1997 | Sher ................................ 331/57 |
| 5,864,258 | A | * | 1/1999 | Cusinato et al. ................ 331/34 |
| 7,733,189 | B1 | * | 6/2010 | Bennett .......................... 331/64 |
| 8,232,844 | B2 | | 7/2012 | Maruko |
| 2004/0119500 | A1 | | 6/2004 | Hazucha et al. |
| 2009/0015340 | A1 | * | 1/2009 | Dally et al. ...................... 331/57 |
| 2010/0271142 | A1 | | 10/2010 | Dosho et al. |
| 2011/0090015 | A1 | * | 4/2011 | Sumita et al. ................... 331/56 |

FOREIGN PATENT DOCUMENTS

JP          2011082954 A          4/2011

OTHER PUBLICATIONS

Kim, J.J. et al., "Low-Noise CMOS LC Oscillator With Dual-Ring Structure," reprinted from *Electronics Letters*, Aug. 19, 2004, vol. 40, No. 17; 2 pages.

* cited by examiner

*Primary Examiner* — Richard Tan
(74) *Attorney, Agent, or Firm* — Seed IP Law Group PLLC

(57) ABSTRACT

An electronic circuit including two ring oscillators, wherein the output of each ring oscillator is looped back on the input of this same oscillator as well on the input of the other oscillator. The application of such a circuit to the detection of a dynamic disturbance.

19 Claims, 2 Drawing Sheets

CLOCK SIGNAL SYNCHRONIZATION AND DISTURBANCE DETECTOR

BACKGROUND

1. Technical Field

The present disclosure generally relates to electronic circuits and, more specifically, to the detection of local dynamic disturbances in an integrated circuit.

2. Description of the Related Art

Many techniques aiming at detecting the occurrence of a dynamic disturbance in an integrated circuit are known. Such disturbances, when they are intentional, are due to fault injection attempts for disturbing the operation of a circuit. Such is especially the case when the circuit performs cryptographic operations manipulating so-called secret quantities. The introduction of a local disturbance (for example, by laser attack) causes one or several changes in logic circuits that may be exploited to discover the secret quantities.

A first category of detectors is exploited in phases of testing of an integrated circuit to assess its resistance to such attacks. Dedicated circuits, which are submitted to disturbances to assess the dynamic behavior of the circuit, are then provided.

A second category of detectors relates to detectors exploited during the lifetime of the product. The result of the detection is then exploited by the circuit to take possible counter-measures against the detected disturbance.

Detectors that exploit a disturbance of a clock signal are particularly capable of detecting dynamic disturbances. Such detectors often exploit two clock signals generated by identical circuits and placed at different circuit locations. The generated clock signals are then compared, to detect the occurrence of a possible disturbance on one of the two signals. A difficulty is that, despite all the care that may be taken to have identical clock generation circuits, in practice, a drift is typically present and it is accordingly difficult to tell a short dynamic disturbance from a phase shift due to manufacturing.

BRIEF SUMMARY

An embodiment overcomes all or part of the disadvantages of known disturbance detectors.

Another embodiment provides a detector which is particularly capable of detecting short dynamic disturbances, for example, of the type obtained by a laser attack.

Another embodiment provides a detector compatible with an exploitation in test mode and during the circuit lifetime.

Thus, an embodiment provides an electronic circuit comprising two ring oscillators, wherein the output of each ring oscillator is looped back on the input of this same oscillator as well on the input of the other oscillator.

According to an embodiment, the input of each oscillator crosses a NAND-type logic function receiving the output of the concerned oscillator as well as the output of an inverter of same rank of the other oscillator.

According to an embodiment, the oscillators comprise the same number of inverters.

According to an embodiment, the respective outputs of the oscillators are compared.

Another embodiment provides a circuit for detecting a dynamic disturbance comprising such an electronic circuit, the output signal of the comparator providing the result of the detection.

Another embodiment provides a method for detecting a local dynamic disturbance in an integrated circuit, at the level of a first ring oscillator, wherein the output signal of the first oscillator is compared with an output signal of a second ring oscillator.

According to an embodiment, the disturbance is a laser beam disturbance.

According to an embodiment, an integrated circuit includes a first ring oscillator having an input and an output, the output of the first ring oscillator coupled to the input of the first ring oscillator and a second ring oscillator having an input and an output, the output of the second ring oscillator coupled to the input of the second ring oscillator, the output of the first ring oscillator further coupled to the input of the second ring oscillator and the output of the second ring oscillator further coupled to the input of the first ring oscillator. In the embodiment, the first and second ring oscillators each include a series arrangement of a plurality of inverters, and an inverter of a selected rank in the first ring oscillator is configured to output a high value in an idle state and an inverter of a same selected rank in the second ring oscillator is configured to output a high value in the idle state.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings. One or more embodiments are described hereinafter with reference to the accompanying drawings in which.

DETAILED DESCRIPTION

Figure 1:
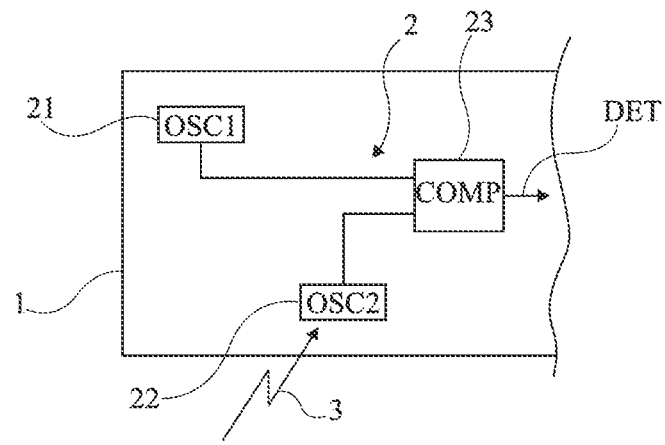
FIG. 1 is a very simplified block diagram of an embodiment of a disturbance detector.

The same elements have been designated with the same reference numerals in the different drawings, where the timing diagrams have been drawn out of scale. For clarity, only those elements which are useful to the understanding of the described embodiments have been detailed. In particular, the exploitation of a signal for detecting the presence of a disturbance has not been detailed, the described embodiments being compatible with any usual exploitation, be it a test or a detection, during the lifetime of the product in the context of a protection against fault injections.

FIG. 1 is a very simplified representation of an electronic circuit (typically, an integrated circuit) comprising a device 2 for detecting a disturbance, for example, under the effect of a laser attack 3. Integrated circuit 1 may comprise various digital and/or analog functions, not detailed. Detection device 2 is based on the use of two ring oscillators 21 and 22 (OSC1 and OSC2), arranged at different locations of integrated circuit 1. Preferably, oscillators 21 and 22 are distant from each other so that in case of a laser beam attack (disturbance caused by a laser beam) on one of them, the other remains unaffected. The signals provided by oscillators 21 and 22 are compared by a comparator 23 (COMP), which delivers a detection signal DET to the rest of the circuit.

The exploitation of signal DET is different according to whether it is a test procedure or a detection during the circuit lifetime. In the case of a test, for example, the formed circuit may be qualified. In the case of a detection during the circuit lifetime, the signal is used, for example, to put the integrated circuit out of service or to take other counter-measures in case of a fault injection attack.

It could have been devised to form oscillators 21 and 22 independently and to consider one of the two oscillators as generating a reference signal to be compared to the other. However, an issue is that typical manufacturing drifts between the two oscillators result in that the signals they provide are not in phase. Accordingly, the comparator would detect a phase-shift as the possible presence of a dynamic disturbance.

Figure 2:
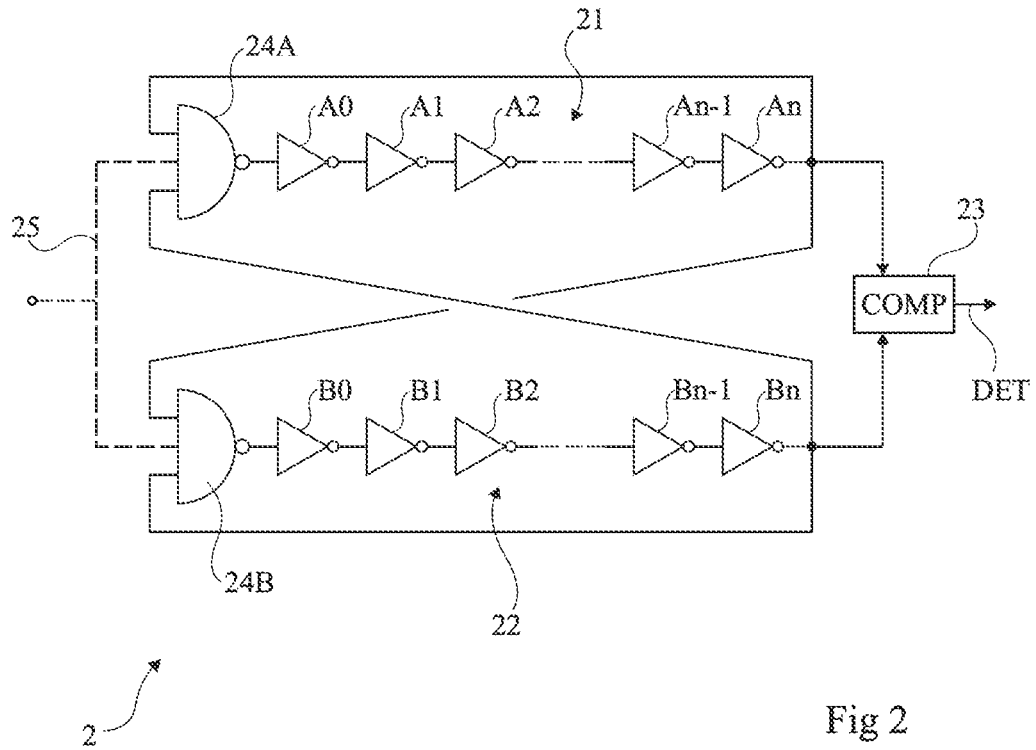
FIG. 2 shows a more detailed diagram of an embodiment of a dynamic disturbance detection circuit.

FIG. 2 is an electric diagram of an embodiment of detection circuit 2 of FIG. 1.

Each ring oscillator 21, 22 is formed of a same number of inverters A0, A1, A2, ... An-1, An and B0, B1, B2, ... Bn-1 and Bn in series. The respective outputs of inverters An and Bn are connected to the inputs of comparator 23 (COMP) providing signal DET. As a variation, any intermediary signal sampled between two inverters Ai and Bi of the ring oscillators may be used for the comparison, provided for it to be sampled from each output oscillator of the inverter of same rank i (with i ranging between 0 and n).

The output of the last inverter An or Bn of each oscillator is looped back on the input of the first one A0 or B0. A NAND logic gate 24A is interposed between the output of inverter An and the input of inverter A0, and a logic NAND gate 24B is interposed between the output of inverter Bn and the input of inverter B0.

The function of gates 24A and 24B is to combine the feedback of each of the oscillators with the output of the other oscillator, to provide a self-synchronization. Accordingly, the output of inverter An is also connected to the input of gate 24B of the oscillator 22 and the output of inverter Bn is also connected to the input of gate 24A of oscillator 21. As a variation, gates 24A and 24B are interposed between other inverters, provided for them to be of same rank.

Optionally (dotted lines 25 in FIG. 2), third respective inputs of gates 24A and 24B receive a common synchronization signal. This signal is for example used to initialize the detector. However, this signal is not indispensable, the detector automatically operating as soon as the inverters and logic gates are powered.

Figure 3:
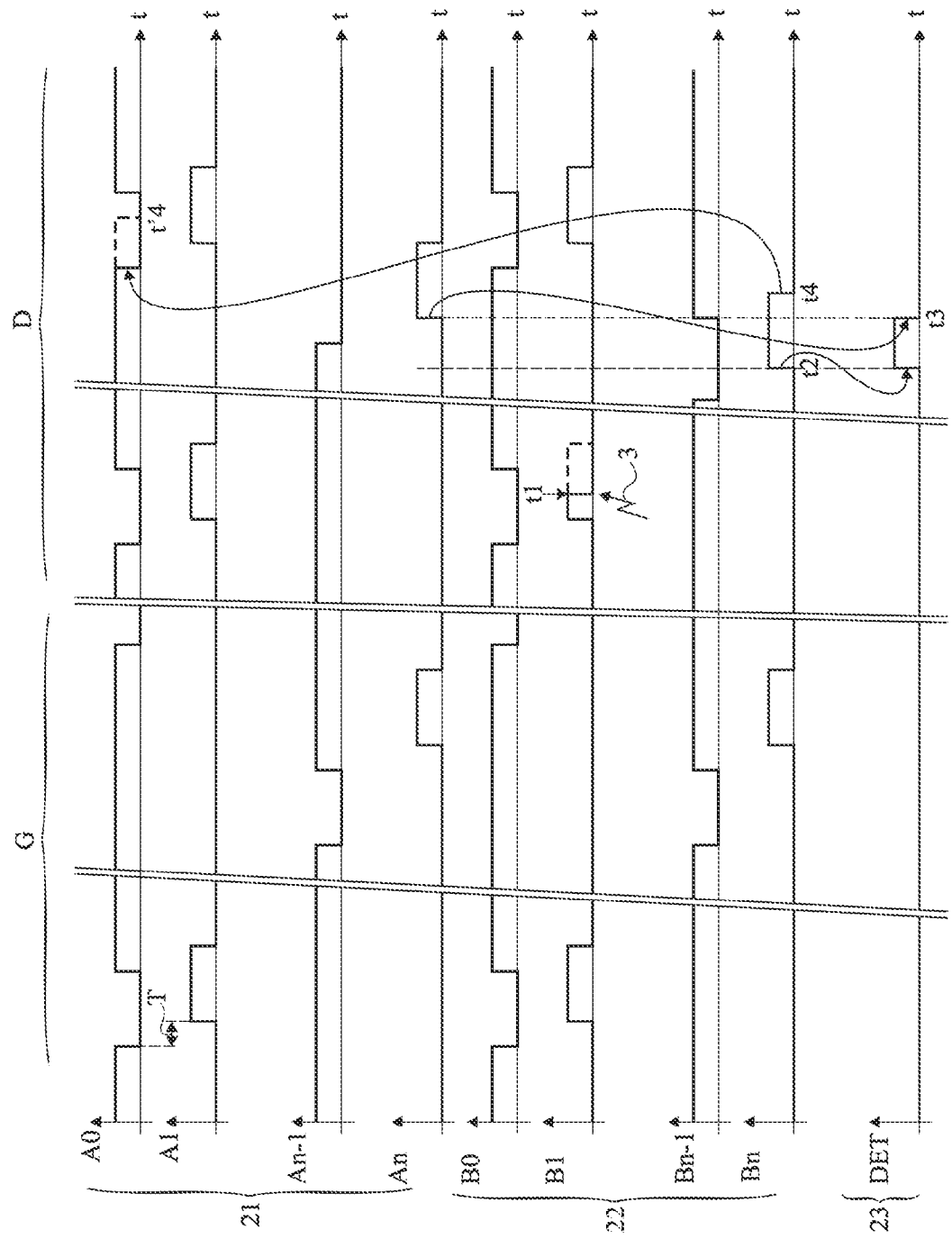
FIG. 3 illustrates, in the form of timing diagrams, the operation of the circuit of FIG. 2.

FIG. 3 illustrates, in the form of timing diagrams, the operation of the detector of FIG. 2. This drawing shows examples of shapes of the output signals of inverters A0, A1, An-1, An, B0, B1, Bn-1, Bn, and DET. In left-hand portion G of FIG. 3, a normal operation is assumed. The case of a disturbance detection will then be illustrated in relation with right-hand portion D of FIG. 3.

The illustrated signals show the respective inverter outputs. In this embodiment, it is assumed that the output signal of inverter A0 is idle in the high state. The idle state of the output of inverter A1 thus is the low state, and so on. The number of inverters is assumed to be even (n is odd) and the output of inverter An of rank n thus is idle in the low state. The same structure is provided on the side of oscillator 22.

In the oscillators, a square pulse in the low state at the output of inverters A0, An-1, B0, Bn-1 (and the other inverters of even rank) and in the high state for inverters A1, An, B1, and Bn-1 (and the other inverters of odd rank) propagates in rings 21 and 22. The respective propagation times in the inverters introduce a delay T between the edges of the different signals.

In left-hand portion G of FIG. 3, signal DET remains inactive (for example, in the low state) since the respective outputs of inverters An and Bn are identical. The two oscillators are assumed to be synchronized in this operation.

In right-hand portion D of FIG. 3, a disturbance 3 of oscillator 22 at a time t1 is assumed while the square pulse transits from inverter A1 to inverter A2 (and from inverter B1 to inverter B2). The presence of this disturbance at the level of oscillator 22 for example causes the disappearing of this square pulse at the output of inverter B1. Accordingly, the output signals of the inverters of higher rank in oscillator 22 are ahead of those of oscillator 21.

When this square pulse reaches the level of inverter Bn (time t2), this causes the switching of signal DET since the square pulse has not reached the output of inverter An in oscillator 21 yet.

The duration of detection signal DET is short and only lasts for the time of the phase shift between signals An and Bn. Signal DET becomes inactive again at a time t3 when signal An switches. Further, the disappearing of the square pulse on the signal of inverter Bn at a time t4 causes the switching of inverter A0 in advance with respect to a time t'4 when it should have shifted by only following the looping back by inverter An. Accordingly, the resynchronization of the two oscillators is performed immediately after the disturbance detection.

A phase shift may be detected at the circuit starting (when the oscillators are powered on) and result in an erroneous detection. It is sufficient not to take into account the first detection which immediately follows the starting of the circuit, which then automatically resynchronizes after the first travel of the pulse through the respective rings of the oscillators.

It is now possible to detect a disturbance by means of ring oscillators in a particularly simple way.

Various embodiments have been described, and various alterations and modifications will occur to those skilled in the art. In particular, the practical forming of the ring oscillators functionally illustrated by inverters may in practice be performed by means of more complex logic gates, provided for the two functions to have the same structure. Further, although the present invention has been described in relation with the use of two self-synchronized ring oscillators for a fault injection detection, it more generally applies to the self-synchronization of two oscillators intended to deliver clock signals to any electronic circuit. Synchronization signal 25 may be used, for example, for the initial triggering of the circuit by sending the pulse intended to travel through the rings. Similarly, the arrangement of the oscillators in the integrated circuit (and in the comparator) depends on the application and may be determined by considering the available space, a need to place one of the oscillators close to an area critical in terms of security of the manipulated data, etc.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic circuit, comprising:
   two ring oscillators, each ring oscillator having an input and an output, the input configured to receive a common synchronization signal, the output of each ring oscillator is coupled back on the input of the same oscillator and coupled back on the input of the other oscillator; and
   a comparator having inputs coupled to respective outputs of the two ring oscillators, wherein the comparator is configured to detect a dynamic disturbance of the circuit, an output signal of the comparator arranged to provide a result of the detection.

2. The circuit of claim 1, comprising:
   two NAND-type logic circuits, each NAND-type logic circuit having a first input coupled to an inverter of a determined rank from one of the two ring oscillators and a second input coupled to an inverter of a same determined rank from the other of the two ring oscillators, wherein the input of each ring oscillator is coupled to an output of a respective one of the two NAND-type logic circuits.

3. The circuit of claim 1 wherein each ring oscillator comprises a same number of inverters.

4. A method, comprising:
   detecting a local dynamic disturbance in an integrated circuit at a first ring oscillator, the first ring oscillator having an input and an output, the detecting including the acts of:
   applying an output signal of the first ring oscillator to the input of the first ring oscillator and an input of a second ring oscillator, the second ring oscillator having the input and an output;
   applying the output signal of the second ring oscillator to the input of the first ring oscillator and the input of the second ring oscillator;
   applying the output signal of the first ring oscillator to a comparator; and
   applying the output signal of a second ring oscillator to the comparator.

5. The method of claim 4 wherein the detecting comprises detection of a laser beam disturbance.

6. The method of claim 4 wherein the detecting the local dynamic disturbance in the integrated circuit at the first ring oscillator, comprises:
   applying the output signal of the first ring oscillator to a first input of a first NAND-type circuit and a first input of a second NAND-type circuit;
   applying the output signal of the second ring oscillator to a second input of the first NAND-type circuit and a second input of the second NAND-type circuit;
   applying an output signal of the first NAND-type circuit to the input of the first ring oscillator; and
   applying an output signal of the second NAND-type circuit to the input of the second ring oscillator.

7. The method of claim 6 wherein the detecting the local dynamic disturbance in the integrated circuit at the first ring oscillator, comprises:
   applying a signal from a common synchronization signal node to a third input of the first NAND-type circuit; and
   applying the signal from the common synchronization signal node to a third input of the second NAND-type circuit.

8. An integrated circuit, comprising:
   a first ring oscillator having an input and an output, the output of the first ring oscillator coupled to the input of the first ring oscillator;
   a second ring oscillator having an input and an output, the output of the second ring oscillator coupled to the input of the second ring oscillator, the output of the first ring oscillator further coupled to the input of the second ring oscillator and the output of the second ring oscillator further coupled to the input of the first ring oscillator; and
   a comparator circuit having inputs and an output, wherein the inputs of the comparator circuit are coupled to the outputs of the first and second ring oscillators and the output of the comparator circuit provides a signal indicative of a local dynamic disturbance in the integrated circuit.

9. The integrated circuit of claim 8 wherein the first and second ring oscillators each comprise:
   a series arrangement of a plurality of inverters.

10. The integrated circuit of claim 8 wherein the first and second ring oscillators each comprise:
    a series arrangement of a plurality of N inverters, N being an integer greater than 3, wherein each successive inverter indicates a different successive rank, and wherein the output of the first ring oscillator is drawn from an inverter having a same rank as the output of the second ring oscillator.

11. The integrated circuit of claim 9 wherein an inverter of a selected rank in the first ring oscillator is configured to output a high value in an idle state and an inverter of a same selected rank in the second ring oscillator is configured to output a high value in the idle state.

12. The integrated circuit of claim 9, comprising:
    a first NAND-type circuit having inputs and an output, wherein the inputs of the first NAND-type circuit are coupled to the outputs of the first and second ring oscillators and the output of the first NAND-type circuit is coupled to the input of the first ring oscillator; and
    a second NAND-type circuit having inputs and an output, wherein the inputs of the second NAND-type circuit are coupled to the outputs of the first and second ring oscillators and the output of the second NAND-type circuit is coupled to the input of the second ring oscillator.

13. The integrated circuit of claim 12 wherein the inputs of the first and second NAND-type circuits are coupled to a common synchronization signal node.

14. An integrated circuit, comprising: a first ring oscillator wherein an output of the first ring oscillator is directly connected through a first synchronization circuit to an input of the first ring oscillator;
    a second ring oscillator wherein an output of the second ring oscillator is directly connected through a second synchronization circuit to an input of the second ring oscillator, wherein the output of the first ring oscillator is directly connected through the second synchronization circuit to the input of the second ring oscillator, and wherein the output of the second ring oscillator is directly connected through the first synchronization circuit to the input of the first ring oscillator; and
    a comparator circuit, wherein the output of the first ring oscillator is directly connected to a first input of the comparator circuit, the output of the second ring oscillator is directly connected to a second input of the comparator circuit, and an output of the comparator circuit provides a signal indicative of a local dynamic disturbance in the integrated circuit.

15. The integrated circuit of claim 14 wherein inputs of the first and second synchronization circuits are coupled to a common synchronization signal node.

16. The integrated circuit of claim 14 wherein each of the first ring oscillator and the second ring oscillator has a same number of inverters.

17. The integrated circuit of claim 14 wherein the first ring oscillator is formed at a first location of the integrated circuit and the second ring oscillator is formed at a second location of the integrated circuit, the first location different from the second location.

18. The method of claim 4 wherein detection of the local dynamic disturbance in the integrated circuit is ignored immediately following starting of the integrated circuit.

19. The integrated circuit of claim 14 wherein each of the first and second synchronization circuits comprise at least one NAND gate circuit.

* * * * *